United States Patent
Reid et al.

(10) Patent No.: US 9,128,693 B2
(45) Date of Patent: Sep. 8, 2015

(54) SYSTEMS AND METHODS FOR WORKFLOW AUTOMATION, ADAPTATION AND INTEGRATION

(75) Inventors: Laurence Reid, Cypress, TX (US); Michael Szatny, The Woodlands, TX (US); William Douglas Johnson, Austin, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 12/842,772

(22) Filed: Jul. 23, 2010

(65) Prior Publication Data
US 2011/0022435 A1 Jan. 27, 2011

Related U.S. Application Data

(63) Continuation of application No. 12/266,766, filed on Nov. 7, 2008, now abandoned.

(60) Provisional application No. 60/987,066, filed on Nov. 10, 2007.

(51) Int. Cl.
| | |
|---|---|
| G06Q 10/00 | (2012.01) |
| G06F 9/44 | (2006.01) |
| G06Q 10/06 | (2012.01) |
| G06Q 10/10 | (2012.01) |

(52) U.S. Cl.
CPC .............. *G06F 8/30* (2013.01); *G06Q 10/0633* (2013.01); *G06Q 10/10* (2013.01)

(58) Field of Classification Search
USPC ........ 705/7.11–7.42; 703/1–23; 166/244–304
See application file for complete search history.

(56) References Cited

U.S. PATENT DOCUMENTS

| | | | |
|---|---|---|---|
| 5,826,239 A * | 10/1998 | Du et al. ........................... | 705/8 |
| 6,086,617 A | 7/2000 | Waldon et al. | |
| 6,236,894 B1 | 5/2001 | Stoisits et al. | |
| 6,253,206 B1 * | 6/2001 | Burton et al. .............. | 707/103 R |
| 6,266,619 B1 * | 7/2001 | Thomas et al. .................. | 702/13 |
| 6,272,434 B1 | 8/2001 | Wisler et al. | |
| 6,308,163 B1 * | 10/2001 | Du et al. ........................... | 705/8 |
| 6,356,844 B2 | 3/2002 | Thomas et al. | |
| 6,367,548 B1 | 4/2002 | Purvis et al. | |
| 6,424,948 B1 * | 7/2002 | Dong et al. ....................... | 705/9 |
| 6,434,435 B1 | 8/2002 | Tubel et al. | |
| 6,519,568 B1 * | 2/2003 | Harvey et al. ..................... | 705/1 |
| 6,549,854 B1 * | 4/2003 | Malinverno et al. ............ | 702/16 |
| 6,678,744 B2 * | 1/2004 | Moon et al. ..................... | 719/328 |
| 6,686,423 B1 * | 2/2004 | Desbois et al. ............... | 526/177 |

(Continued)

FOREIGN PATENT DOCUMENTS

WO 2007116008 A1 10/2007

OTHER PUBLICATIONS

Merz, M. et al., (Interorganizational Workflow Management with Mobile Agents in COSM; Conference on the Practical Application of Agents and Multi-Agency Systems, PAAM'96, 1996).*

(Continued)

*Primary Examiner* — Alan S Miller
(74) *Attorney, Agent, or Firm* — Crain Caton & James; John Wustenberg

(57) ABSTRACT

Systems and methods for implementing complex and disparate workflows, wherein a flexible framework (system architecture) is used for workflow automation, adaptation and integration.

14 Claims, 14 Drawing Sheets

(56) References Cited

U.S. PATENT DOCUMENTS

| | | | |
|---|---|---|---|
| 6,691,151 B1* | 2/2004 | Cheyer et al. | 709/202 |
| 6,816,902 B1* | 11/2004 | Bandat et al. | 709/226 |
| 6,826,483 B1* | 11/2004 | Anderson et al. | 702/13 |
| 6,853,921 B2* | 2/2005 | Thomas et al. | 702/14 |
| 6,868,423 B2 | 3/2005 | Ohta et al. | |
| 6,873,267 B1 | 3/2005 | Tubel et al. | |
| 6,938,240 B2* | 8/2005 | Charisius et al. | 717/104 |
| 6,980,929 B2 | 12/2005 | Aronstam et al. | |
| 6,980,940 B1* | 12/2005 | Gurpinar et al. | 703/10 |
| 7,047,535 B2* | 5/2006 | Lee et al. | 719/328 |
| 7,058,933 B2* | 6/2006 | Fomenko et al. | 717/145 |
| 7,079,952 B2 | 7/2006 | Thomas et al. | |
| 7,172,020 B2* | 2/2007 | Tseytlin | 166/250.07 |
| 7,236,939 B2* | 6/2007 | Chen et al. | 705/9 |
| 7,289,966 B2* | 10/2007 | Ouchi | 705/7 |
| 7,369,973 B2* | 5/2008 | Kennon et al. | 703/2 |
| 7,373,976 B2 | 5/2008 | Casey | |
| 7,415,716 B2* | 8/2008 | Marin et al. | 719/330 |
| 7,483,879 B2* | 1/2009 | Chang et al. | 707/3 |
| 7,512,543 B2* | 3/2009 | Raghuraman et al. | 705/7.28 |
| 7,590,516 B2* | 9/2009 | Jourdan et al. | 703/10 |
| 8,249,844 B2* | 8/2012 | Dale et al. | 703/10 |
| 8,311,789 B2* | 11/2012 | Eyvazzadeh et al. | 703/10 |
| 2001/0013033 A1 | 8/2001 | Burton et al. | |
| 2002/0038217 A1* | 3/2002 | Young | 705/1 |
| 2002/0070953 A1* | 6/2002 | Barg et al. | 345/700 |
| 2002/0078432 A1* | 6/2002 | Charisius et al. | 717/102 |
| 2002/0099505 A1* | 7/2002 | Thomas et al. | 702/12 |
| 2002/0103688 A1 | 8/2002 | Schneider | |
| 2002/0120429 A1* | 8/2002 | Ortoleva | 703/2 |
| 2002/0161840 A1* | 10/2002 | Willcox et al. | 709/206 |
| 2002/0169658 A1* | 11/2002 | Adler | 705/10 |
| 2002/0177955 A1 | 11/2002 | Jalali et al. | |
| 2002/0188644 A1* | 12/2002 | Seidman | 709/100 |
| 2004/0010591 A1* | 1/2004 | Sinn et al. | 709/225 |
| 2004/0073505 A1* | 4/2004 | Wright | 705/36 |
| 2004/0220790 A1* | 11/2004 | Cullick et al. | 703/10 |
| 2004/0230941 A1* | 11/2004 | Marin et al. | 717/100 |
| 2005/0015741 A1* | 1/2005 | Langkafel et al. | 717/101 |
| 2005/0119911 A1* | 6/2005 | Ayan et al. | 705/1 |
| 2005/0209836 A1* | 9/2005 | Klumpen et al. | 703/10 |
| 2005/0209912 A1* | 9/2005 | Veeningen et al. | 705/11 |
| 2006/0015619 A1* | 1/2006 | Tse et al. | 709/226 |
| 2006/0074732 A1* | 4/2006 | Shukla et al. | 705/8 |
| 2007/0179766 A1 | 8/2007 | Cullick et al. | |
| 2007/0179767 A1 | 8/2007 | Cullick et al. | |
| 2007/0179768 A1 | 8/2007 | Cullick et al. | |
| 2007/0192072 A1 | 8/2007 | Cullick et al. | |
| 2007/0198223 A1 | 8/2007 | Ella et al. | |
| 2007/0203681 A1* | 8/2007 | Eyvazzadeh et al. | 703/10 |
| 2007/0265895 A1* | 11/2007 | Moore | 705/7 |
| 2007/0271039 A1 | 11/2007 | Ella et al. | |
| 2008/0103743 A1* | 5/2008 | Howell et al. | 703/10 |
| 2008/0126067 A1* | 5/2008 | Haas et al. | 703/17 |
| 2008/0133194 A1 | 6/2008 | Klumpen et al. | |
| 2009/0070158 A1* | 3/2009 | Virine et al. | 705/7 |
| 2009/0125362 A1* | 5/2009 | Reid et al. | 705/8 |

OTHER PUBLICATIONS

Hiramatsu, Keiko et al., (Interworkflow System: Coordination of Each Workflow System Among Multiple Organizations; Third International Conference of Cooperative Information Systems, 1998).*

Schulz, Karsten et al. (Architecting Cross-Organizatinoal B2B Interactions; Conference on Enterprise Distributed Object Computing, 2000).*

Sladek, Aija et al. (Modeling Inter-Organizational Workflows; Proceedings International Symposium on Applied Corporate Computing, ISACC'96, Oct. 1996).*

Han, Yanbo et al. (A Taxonomy of Adative Workflow Management; 1998 ACM Conference on Computer Supported Cooperative Work, 1998).*

Voorhoeve M. et al.(Ad-hoc Workflow: Problem and Solutions; IEEE, 1997, pp. 36-40).*

Meijler, Theo Dirk et al.(Realising Run-time Adaptable Workflow by means of Reflection in the Baan Workflow Engine; CSCW, 1998).*

Ellis, Clarence et al.(Dynamic Change Within Workflow Systems; COOCS 1995, ACM, pp. 10-21).*

Heinl, Petra et al.(A Comprehensive Approach to Flexibility in Workflow Management Systems; ACM, 1999, pp. 79-88).*

R. Soma, A. Bakshi, A. Orangi, and V.K. Prasanna; "A Service-Oriented Data-Composition Architecture for Integrated Asset Management" Intelligent Energy Conference and Exhibition, Apr. 11-13, 2006, pp. 1-8; Amsterdam, The Netherlands, Society of Petroleum Engineers; Paper No. 99983-MS; DOI: 10.2118/99983-MS http://www.spe.org/elibrary/servlet/spepreview?id=SPE-99983-MS.

L. Saputelli, M. Nikolaou, M.J. Economides; "Self-Learning Reservoir Management" Journal SPE Reservoir Evaluation & Engineering Volume vol. 8, No. 6, 2005, pp. 534-547, Society of Petroleum Engineers. Paper No. 84064-PA.

C.J. Airlie, Z.R. Lemanczyk "Intelligent Asset Management: Successful Integration of Modelling Tools and Workflow Processes" SPE Asia Pacific Conference on Integrated Modelling for Asset Management, Mar. 29-30, 2004, Kuala Lumpur, Malaysia; pp. 1-9; Paper No. 87019-MS.

Martijn Hooimerijer and Mohaamad Azmi; Shell Global Solutions "Advanced Production Monitoring" International Oil & Gas Conference and Exhibition in China, Dec. 5-7, 2006, Beijing, China. pp. 1-10. Society of Petroleum Engineers; Paper No. 104161-MS.

A. Inojosa, M. L. Bortolin, B. Jardine De Venezuela; "Lagocinco's production optimisation in real-time" SCADEL'98 : 4th international conference & exhibition on SCADA & telemetry systems for the oil & gas indsutry : London, Apr. 2-3, 1998; p. 1-15.

Jørn Ølmheim, Einear Landre, and Eileen A. Quale; SPE, StatoilHydro "Improving Production by Use of Autonomous Systems" Intelligent Energy Conference and Exhibition, Feb. 25-27, 2008, Amsterdam, The Netherlands; pp. 1-12; Society of Petroleum Engineers; Paper No. 112078-MS.

Waring, Burney, Theuveny, Bertrand. Davies, Dave; Guedroudj, Hamid, Danquigny, Jacques, Brink, James, Shyeh, Jane, Gibbons, Kate, Toro, Mario, Diez, Marta Duenas, Jakeman, Simon and Aksland, Tor Gunnar; Guidance on the Future of Real Time Production Optimisation in E&P; SPE Forum on RTPO; Nov. 6, 2007; pp. 1-9; Forum Steering Committee.

Image & Remote Deposit Capture Guide for the Financial Institution; 1st edition; Upper Midwest ACH Association, Wisconsin ACH Association; pp. 1-37; 2008.

Szatny, Michael: Enabling Automated Workflows for Production; pp. 1-4; 2007 Society of Petroleum Engineers Annual Technical Conference and Exhibition; Anaheim, CA; Nov. 11-14, 2007.

AssetConnect Software (Brochure); Landmark Graphics Corporation; USA; 4 pages; Jun. 2007.

iSight-FD Getting Started Guide, version 2.5; Dec. 2006; 174 pages.

iSight-FD Development Guide, version 2.5; Dec. 2006; 116 pages.

iSight-FD Runtime Gateway Guide, version 2.5; Dec. 2006; 146 pages.

iSight-FD Design Gateway Training slides; Jan. 2007; 493 pages.

Article 34 Amendment and Response, PCT/US08/82610, Apr. 19, 2010, 13 pages.

International Preliminary Report on Patentability, PCT/US08/82610, Jul. 28, 2010, 26 pages.

Digital Energy Journal (Jan. 2008, Issue 10).

Engineous WebPages (As retrieved from web.archive.org of http://www.engineous.com).

Engineous Software Launches New iSight-FD Product; Customers Get the Opportunity to Try Before They Buy with Free Software Evaluation; Business Wire, New York. Jan. 10, 2006, p. 1.

Merz, M. et al., (Interorganizational Workflow Management with Mobile Agents in COSM Conference on the Practical Application of Agents and Multi-Agency Systems, PAAM'96, 1996).

Hiramatsu, Keiko et al., (Interworkflow System: Coordination of Each Workflow System Among Multiple Organizations Third International Conference of Cooperative Information Systems, 1998).

Schulz, Karstenet al. (Architecting Cross-Organizatinoal B2B Interactions Conference on Enterprise Distributed Object-Computing, 2000).

(56) References Cited

OTHER PUBLICATIONS

Sladek, Aija et al. (Modeling Inter-Organizational Workflows Proceedings International Symposium on Applied Corporate Computing, ISACC'96, Oct. 1996).
Han, Yanbo et al. (A Taxonomy of Adative Workflow Management 1998 ACM Conference on Computer Supported Cooperative Work,1998).
Voorhoeve M. et al.(Ad-hoc Workflow: Problem and Solutions IEEE, 1997, pp. 36-40).
Meijler, Theo Dirk et al.(Realising Run-time Adaptable Workflow by means of Reflection in the Baan Workflow Engine CSCW, 1998).
Ellis, Clarence et al.(Dynamic Change Within Workflow Systems COOCS 1995, ACM, pp. 10-21).
Heinl, Petra et al.(A Comprehensive Approach to Flexibility in Workflow Management Systems ACM, 1999, pp. 79-88).
Manuel Lopez, Response to Office Action, Mexican Patent Application No. MX/a/2010/005116, Jan. 20, 2017, 2 pages, Mexican Institute of Industrial Property, Mexico.
Mexican Institute of Industrial Property, Office Action, Mexican Patent Application No. MX/a/2010/005116, Mar. 11, 2014 , 3 pages, Mexican Institute of Industrial Property, Mexico.
Mexican Institute of Industrial Property, Office Action, Mexican Patent Application No. MX/a/2010/005116, Oct. 22, 2013, 2 pages, Mexican Institute of Industrial Property, Mexico.
Michael Moltenbrey, Extended Search Report,European Application No. 13153520.5, Jul. 23, 2013, 9 pages, European Patent Office, Netherlands.
Han Yan, Second Notification of Office Action, Office Action, Apr. 28, 2012, 6 pages, The State Intellectual Property Office of China, China.
Michael Moltenbrey, Supplementary European Search Report, EP Application No. EP08848362, Jul. 3, 2012, 6 pages, European Patent Office, The Netherlands.
Stephen McGough, An End-to-end Workflow Pipeline for Large-scale Grid Computing, Journal of Grid Computing, 2006, 23 pages, London.
Han Yan, Decision on Rejection, Application No. 200880115340.1, Sep. 10, 2012, 7 pages, The State intellectual Property Office of China, China.
Mexican Institute of Industrial Property, Office Action, Mexican Patent Application No. MX/a/2010/005116, Jun. 9, 2013, 4 pages, Mexican Institute of Industrial Property, Mexico.
Eugenio Perez Perez, Response to Office Action, Mexican Patent Application No. MX/a/2010/005116, Aug. 9, 2013, 4 pages, Mexican Institute of Industrial Property, Mexico.
Chirag Menta, Patent Examination Report No. 1, Patent Application No. 2008323932, Mar. 26, 2013, 3 pages, Australian Government IP Australia, Australia.
John Brass, Response to Examiner's Report, Patent Application No. 2008323932, May 3, 2013, 20 pages, Australian Government IP Australia, Australia.
Electronic Records Administration, Notice of Acceptance, Patent Application No. 2008323932, Jun. 11, 2013, 2 pages, Australian Government IP Australia, Australia.
Manuel Lopez, Office Action, Mexican Patent Application No. MX/a/2010/005116, Jun. 4, 2014, 6 pages, Mexican Institute of Industrial Property, Mexico.

\* cited by examiner

| Workflow Step | Participant A | Participant B | Participant C | System |
|---|---|---|---|---|
| 1. Gather new Field Data and input to a database A | ▼ | | | |
| 2. Time Stamp and store field data input | | | | ▼ |
| 3. Access data and enter to petrotechnical application A | | ▼ | | |
| 4. Select data set and perform petrotechnical analysis | | ▼ | | |
| 5. Generate graphical representation of analysis and present for validation | | ▼ | | |
| 6. Validate anaysis - yes or no | | | ◇ —No— / Yes | |
| 7. Enter assumptions from analysis and test scenarios and update petrotechnical model in application B | | | ▼ | ▶ |
| 8. Run petrotechnical model to test for new operational scenarios | | ▼ | | |
| 9. Decide best new operational scenario and present to operations | Delay ◀ | No ◇ / Yes | | |
| 10. Adjust operations to reflect operational scenario. | ▼ | | | |

FIG. 3A

SYSTEMS AND METHODS FOR WORKFLOW AUTOMATION, ADAPTATION AND INTEGRATION

CROSS-REFERENCE TO RELATED APPLICATIONS

The priority of U.S. Provisional Patent Application No. 60/987,066, filed on Nov. 10, 2007, and U.S. patent application Ser. No. 12/266,766, filed on Nov. 7, 2008, is hereby claimed and the specifications thereof are incorporated herein by reference.

STATEMENT REGARDING FEDERALLY SPONSORED RESEARCH

Not applicable.

FIELD OF THE INVENTION

The present invention generally relates to systems and methods for implementing complex and disparate workflows and, more particularly, a flexible framework for workflow automation, adaptation and integration.

BACKGROUND OF THE INVENTION

Hydrocarbon production operations commonly involve numerous workflows that are repetitive in nature and which are traditionally undertaken manually or semi-manually by the various participants who spend significant portions of their time operating technical applications, finding and entering data, conducting analysis and passing data between participants for various steps such as validation and approval, in order to execute such workflows.

Studies have shown, for example, that about 70% of an engineers time is spent gathering, formatting, and translating data for use in these different applications. For standard production activities, i.e., workflows, this time can be drastically reduced by creating an automated system to execute the prescribed workflow. The automated workflow not only reduces the engineers valuable time doing these repetitive tasks, but also ensures consistency in methods, reduces the likelihood of input errors, and creates a repository for "best practices" that can be maintained long term as personnel (and their knowledge) is moved into and out of the production asset.

Additionally, it is common experience that participants in many workflows have different preferences for, and levels of, expertise on numerous applications, which they utilize at respective steps in common workflows. This diversity makes standardization and consistency difficult to achieve.

Furthermore, due to time demands placed by the various workflows, potentially valuable additional analysis options are not routinely undertaken nor are aggregate data sets routinely reviewed in order to learn from the results.

In other industries, and elsewhere in the exploration and production field, business process management systems and certain specific technical application based workflows are automated and orchestrated using different methods and systems from those described by the present invention. Due to the diversity of technology, applications and workflows however, the challenge of workflow orchestration has largely been unresolved.

For many years automated workflows have been a part of the design and production cycles in other industries like Aerospace, Automotive, and Industrial Manufacturing. These industries have been tying together applications and data sources along with using stochastic analysis methods and optimization to improve their overall productivity.

Today's oil and gas operators face daunting challenges. With rising global demand, declining production, growing data volumes, dwindling resources, mounting regulatory and environmental pressures, exploration and production companies must dramatically improve the management of their hydrocarbon assets. The automation of common workflows can help mitigate these challenges by providing a common, best-practice method of execution that can be sustained and measured.

Execution of these automated workflows also must be examined. As production operations become more complex, their associated workflows will also become more complex. It can not be assumed that the end-user of an automated workflow is an "expert" user and has the knowledge and experience to operate all the needed software application interfaces. Ideally, any platform for automating workflows should include ways for non-expert users to interact with and execute complex workflows that were authored by the domain experts.

Currently, oil and gas production workflow automation is typically done through custom integration of disparate systems often requiring engineers to coordinate data flows between a disparate number of applications. Some common workflows may include, for example:
1. Production management and optimization;
2. Fracture stimulation design optimization;
3. Production forecasting and planning; and
4. Gas-lift allocation and optimization.

The custom integration of multiple applications, however, has many deficiencies and would be better replaced by a more standardized framework of integration.

The advantages of workflow automation and integration of various applications are generally described in U.S. Pat. Nos. 6,266,619, 6,356,844, 6,853,921, and 7,079,952, which are assigned to Halliburton Energy Services, Inc. and incorporated herein by reference. These patents generally deal with a field wide reservoir management system. The system includes a suite of tools (compute programs) that seamlessly interface with each other to generate a field wide production and injection forecast. The system produces real time control of downhole production and injection control devices such as chokes, valves and other flow control devices and real time control of surface production and injection control devices. The system, however, does not address a flexible framework that encompasses automated workflows, adaptive workflows and synergistic workflows as defined by the present invention.

Therefore, there is a need for a flexible workflow framework that 1) automates various workflows and their routine execution between multiple participants; 2) provides a common operating environment for consistent execution of the workflows, which is capable of substituting applications at various steps in any workflow; and 3) allows additional steps to be introduced into and incorporated within any workflow.

The workflow framework must therefore, address the following:
1. Moving location of boundary conditions, inputs and output extraction within multi-disciplinary and multi-vendor environments;
2. Intelligent generation and execution of up to thousands of multi-disciplinary simulations; and
3. Convenient storage/retrieval and interpretation of the results.

SUMMARY OF THE INVENTION

The present invention meets the above needs and overcomes one or more deficiencies in the prior art by providing systems and methods for optimizing operational scenarios through a workflow, which i) automates various workflows and their routine execution between multiple participants; ii) provides a common operating environment for consistent execution of the workflows that is capable of substituting applications at various steps in any workflow; and iii) allows additional steps to be introduced into and incorporated within any workflow.

In one embodiment, the present invention includes a method of performing an adaptive routine workflow, which comprises: i) selecting an oilfield data set stored in a petrotechnical application; ii) performing an analysis of the oilfield data set using the petrotechnical application to determine multiple analysis outcomes, which comprise a skin thickness and a well performance plot; iii) performing a Monte-Carlo analysis on each of the multiple analysis outcomes; iv) validating at least one of the multiple analysis outcomes; v) determining a new operational scenario using an updated petrotechnical model and one of the validated multiple analysis outcomes; vi) optimizing the new operational scenario using a computer processor and at least one of a calculated production profile, a forecast and events detected; and vii) adjusting oilfield operations based on the optimized new operational scenario by adjusting a choke and initiating a well workover.

In another embodiment, the present invention includes a non-transitory program carrier device tangibly carrying computer-executable instructions for performing an adaptive routine workflow, the instructions being executable to implement: i) selecting an oilfield data set stored in a petrotechnical application; ii) performing an analysis of the oilfield data set using the petrotechnical application to determine multiple analysis outcomes, which comprise a skin thickness and a well performance plot; iii) performing a Monte-Carlo analysis on each of the multiple analysis outcomes; iv) validating at least one of the multiple analysis outcomes; v) determining a new operational scenario using an updated petrotechnical model and one of the validated multiple analysis outcomes; vi) optimizing the new operational scenario and at least one of a calculated production profile, a Forecast and events detected; and vii) adjusting oilfield operations based on the optimized new operational scenario by adjusting a choke and initialing a well workover.

In yet another embodiment, the present invention includes a method for performing an adaptive periodic workflow, which comprises: i) selecting an oilfield data set stored in a petrotechnical application; ii) removing erroneous data from the oilfield data set; iii) determining a correlation between data remaining in the oilfield data set and data in another petrotechnical application; iv) updating a petrotechnical data model based on an interpretation of the oilfield data set and the correlation; v) determining a new operational scenario using the updated petrotechnical data model; vii) optimizing the new operational scenario using a computer processor and at least one of a calculated production profile, a forecast and events detected; and viii) adjusting oilfield operations based on the optimized new operational scenario by adjusting a choke and initiating a well workover.

In yet another embodiment, the present invention includes a non-transitory program carrier device tangibly carrying computer-executable instructions for performing an adaptive periodic workflow, the instructions being executable to implement: i) selecting an oilfield data set stored in a petrotechnical application; ii) removing erroneous data from the oilfield dataset; iii) determining a correlation between data remaining in the oilfield data set and data in another petrotechnical application; iv) updating a petrotechnical data model based on an interpretation of the oilfield data set and the correlation; v) determining a new operational scenario using the updated data model; (vii) optimizing the new operational scenario and at least one of a calculated production profile, a forecast and events detected; and viii) adjusting oilfield operations based on the optimized new operational scenario by adjusting a choke and initiating a well workover.

In yet another embodiment, the present invention includes a method for performing a synergistic workflow, which comprises: i) selecting an oilfield data set stored in a petrotechnical application; ii) selecting another oilfield data set stored in another petrochemical application; iii) performing an analysis of the another oilfield data set using the another petrotechnical application to determine multiple analysis outcomes, which comprise a skin thickness and a well performance plot; iv) performing a Monte-Carlo analysis on each of the multiple analysis outcomes; v) validating at least one of the multiple analysis outcomes; vi) updating a petrotechnical data model based on an interpretation of the oilfield data set; vii) determining a new operational scenario using the updated petrotechnical data model and one of the validated multiple analysis outcomes; viii) optimizing the new operational scenario using a computer processor and at least one of a calculated production profile, a forecast and events detected; and ix) adjusting oilfield operations based on the optimized new operational scenario by adjusting a choke and initiating a well workover.

In yet another embodiment, the present invention includes a non-transitory program carrier device tangibly carrying computer-executable instructions for performing a synergistic workflow, the instructions being executable to implement: i) selecting an oilfield data set stored in a petrotechnical application; ii) selecting another oilfield data set stored in another petrotechnical application; iii) performing an analysis of the another oilfield data set using the another petrotechnical application to determine multiple analysis outcomes, which comprise a skin thickness and a well performance plot; iv) performing a Monte-Carlo analysis on each of the multiple analysis outcomes; v) validating at least one of the multiple analysis outcomes; vi) updating a petrotechnical data model based on an interpretation of the oilfield data set; vii) determining a new operational scenario using the updated petrotechnical data model and one of the validated multiple analysis outcomes; viii) optimizing the new operational scenario and at least one of a calculated production profile, a forecast and events detected; and ix) adjusting oilfield operations based on the optimized new operational scenario by adjusting a choke and initiating a well workover.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which:

FIG. 3A illustrates a traditional routine workflow.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order.

System and Method Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. AssetConnect™, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored onto any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multiprocessor systems, microprocessor-based or programmable-consume electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Figure 2A:
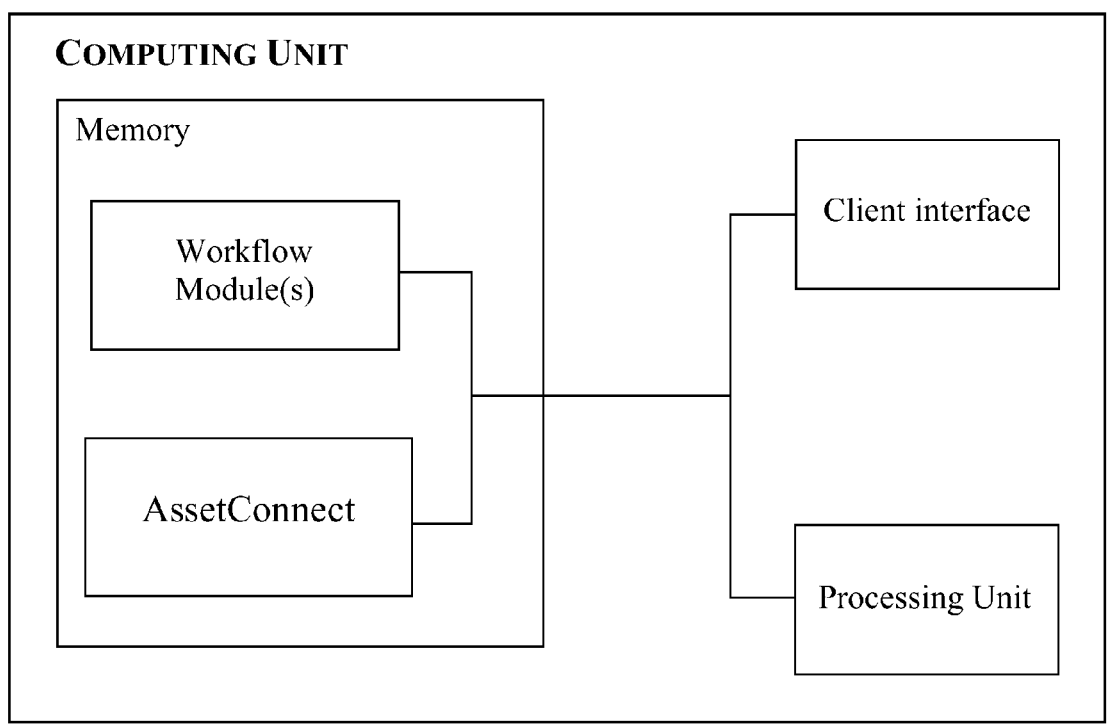
FIG. 2A is a block diagram illustrating one embodiment of a computer system for implementing the present invention.

Referring now to FIG. 2A, a block diagram of a system for implementing the present invention on a computer is illustrated. The system includes a computing unit, sometimes referred to a computing system, which contains memory, application programs, a client interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 2B and 4-12. The memory therefore, includes one or more workflow modules, which enable the workflows illustrated in FIGS. 4-12, and AssetConnect™.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are, often connected to the processing unit through the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Certain system components, which are well known in the art and may be used for implementing the present invention, include:
1. IT/Computing Platforms: PA-PN, where PA is the systems operating environment and PB-PN are all other computing environments common to oil and gas production.
2. Applications: AA-AN, where application AA is the workflow orchestration application and AB-AN are all other technical applications common to oil and gas production.
3. Application Wrappers: WA-WN, the workflow orchestration application includes a software development kit for development of application wrappers for other applications. Alternatively, Application Wrappers WA-WN and System Functions FA-FN need not both be present. Instead, Application Connectors and general workflow tools (i.e., calculator, data transfer, OS command, etc.) may be used.
4. System Functions FA-FN, the system incorporates numerous functions enabling additional analytics and steps to be incorporated within a given workflow (e.g. Monte-Carlo simulation, optimization, etc).

Figure 1:
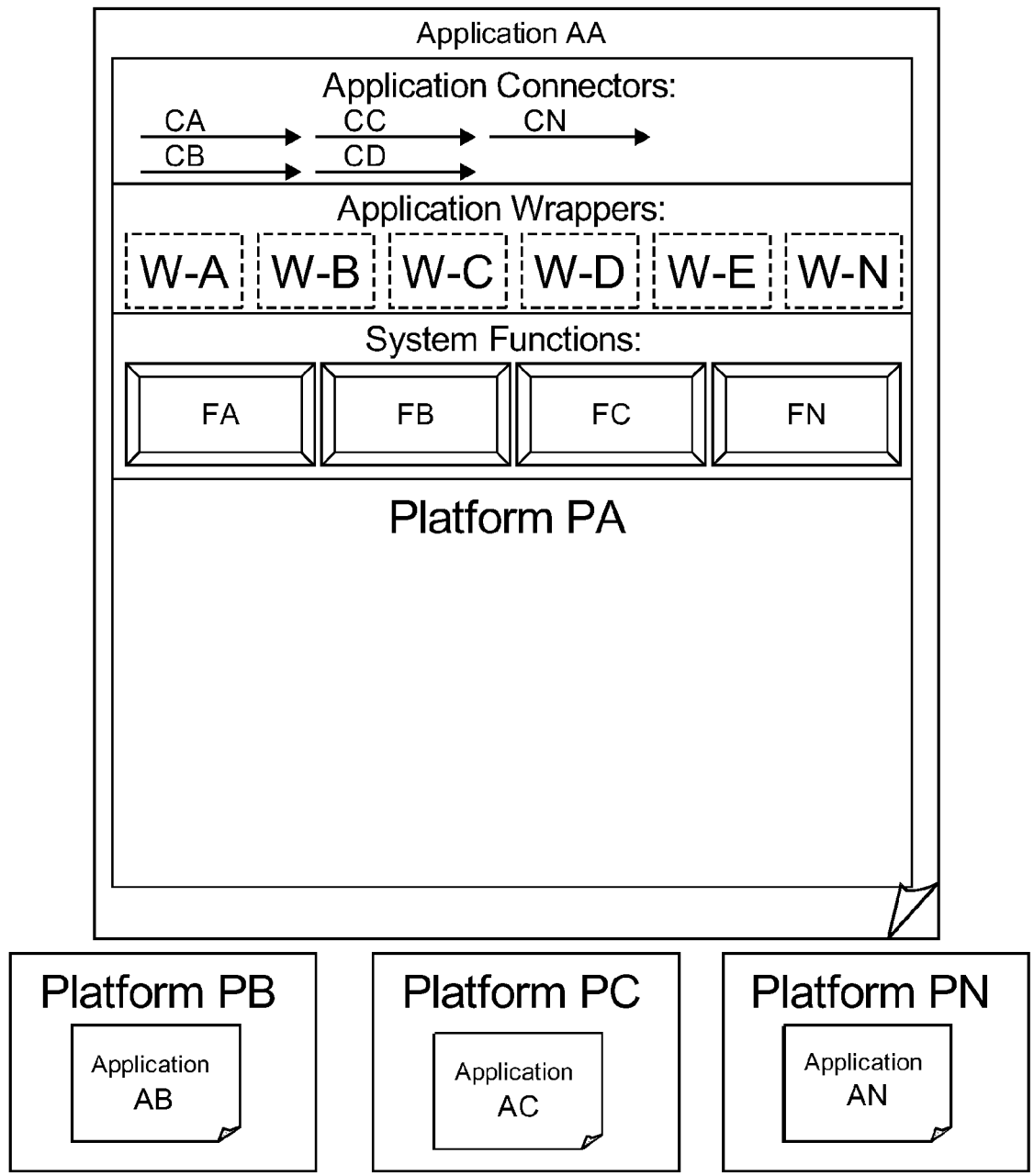
FIG. 1 illustrates one embodiment of a prior art system for implementing the present invention.

An exemplary system comprising such components is commonly referred to in the oil and gas industry as Asset-Connect™, which is illustrated in FIGS. 1 and 2A.

Although many other internal components of the computing unit are not shown, those of ordinary skill in the art will appreciate that such components and their interconnection are well known.

Figure 2B:
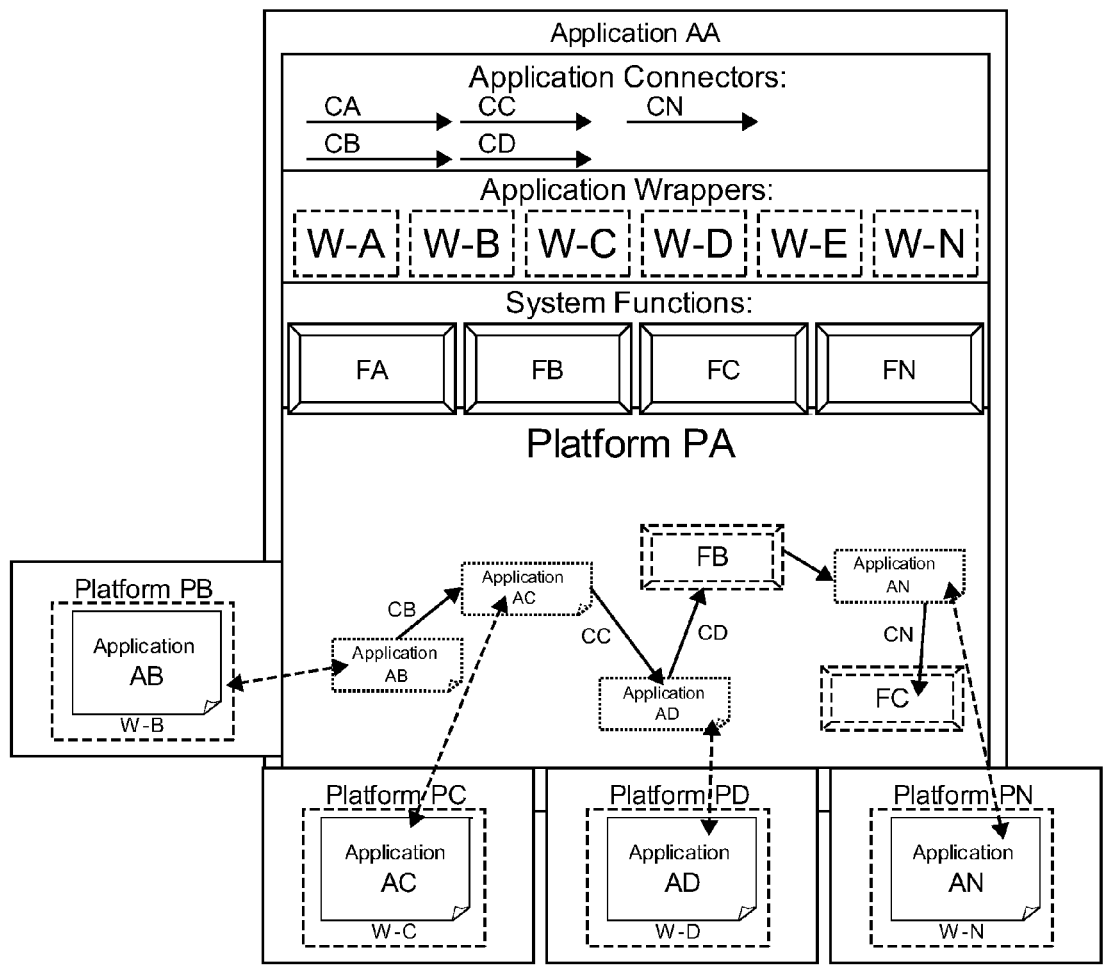
FIG. 2B illustrates one embodiment of a system architecture for implementing the present invention.

An exemplary system architecture for implementing the present invention is illustrated in FIG. 2B. FIG. 2B illustrates the interrelationship of the components in FIG. 1, which may be used to perform the workflows illustrated in FIGS. 4-12.

Referring now to FIG. 2B, the various IT/Computing Platforms (PB-PN), for example, Linux, Windows, etc., which may house the various technical applications (AB-AN), may be interconnected for access to the required technical applications (AB-AN) by means of a Services Oriented Architecture, which permits a unified operating environment wherein the technical applications (AB-AN) can be remotely accessed for incorporation within a workflow.

The various technical applications (AB-AN) are able to be brought into the system from their remote IT platforms by means of Application Wrappers (WB-WN). Thereafter, within the unified operating environment, the technical applications (AB-AN) can be remotely operated within a workflow. The respective technical applications (AB-AN) provide their own functionality consistent with a step or steps in each workflow.

The various technical applications (AA-AN) involved in a workflow are able to be connected by means of Application Connectors (CA-CN). The connectors (CA-CN) allow the workflow author to map to and to connect to attributes within the technical applications (AB-AN) and to map to and relate these to another technical application (AA-AN), effectively mapping inputs and outputs from one step of the workflow to another. In this manner, the workflow logic can be determined to be consistent with the various steps, data and attribute flows within the workflow. In the simplest case, this enables automation of the workflow.

The workflows can also be modified to introduce new-value-added steps by either connecting to additional System Functions (FA-FN) within the workflow orchestration application (AA) or, alternatively, by introducing additional technical applications (AB-AN) not routinely used within the traditional workflows.

Using unique combinations of the system component capabilities in the manner illustrated in FIG. 2B, it is possible to enable automation of the traditional workflow and also to modify the traditional workflow logic to incorporate various combinations of the above capabilities—i.e., in effect enabling novel workflows that are significantly additive to the traditional workflow. The present invention therefore, enables the flow of real time data that can be used for routine (continuous) workflows.

Workflow Description

Figure 3B:
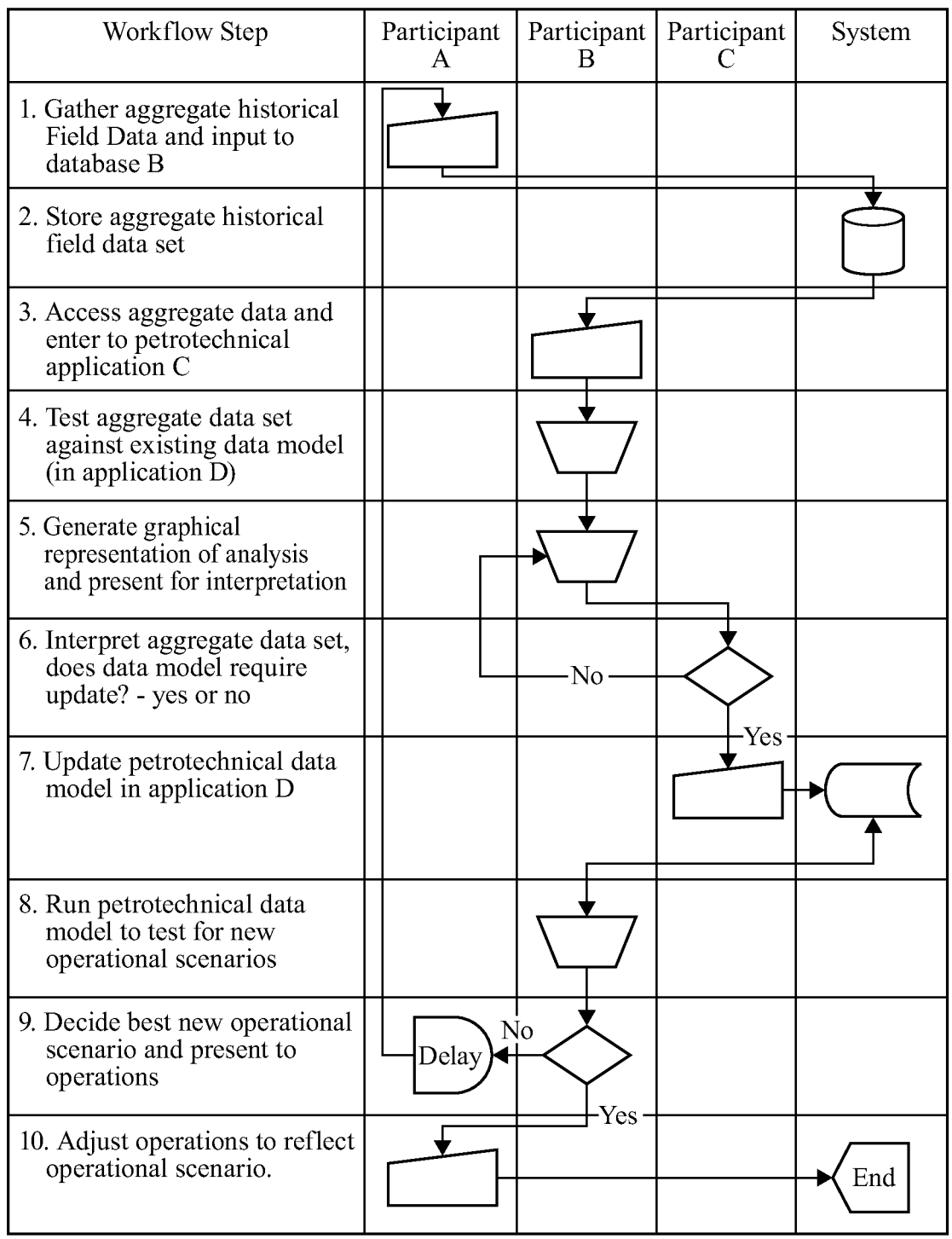
FIG. 3B illustrates a traditional periodic workflow.

Referring now to FIG. 3A and FIG. 3B, a traditional routine workflow (3A) and a traditional periodic workflow (3B) are illustrated for production management and reservoir management, respectively. The traditional workflow is typically manually intensive and expert centric with delays experienced due to interdependencies across multiple participants—each using different applications appropriate to their area of expertise. A definition of each workflow symbol utilized in the description of the following figures is provided in Table 1 below.

TABLE 1

| SYMBOL | DEFINITION |
| --- | --- |
|  | Manual input/activity |
|  | Manual Operation |
|  | Stored Data |
|  | Predefined process |
|  | Database (magnetic disc) |
|  | Decision |
|  | Delay/Pause |
|  | Display |

TABLE 1-continued

| SYMBOL | DEFINITION |
|---|---|
| 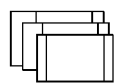 | Multiple iterations of predefined process |
|  End | End |

In FIG. 3A and FIG. 3B, participants A, B and C may interface with certain 'system' components. The participants may be represented by participant A being a field operative, participant B being a petroleum engineer and participant C being a reservoir engineer, for example. Additional participants may be preferred and/or necessary. The workflow steps are performed by the respective participants and at certain steps interfacing with system components and referenced applications. The referenced applications may therefore, include, for example, petrotechnical application A, which might be a nodal analysis application, and petrotechnical application B, which might be a reservoir simulation application. Analysis and reporting from use of application A might typically include representation of a calculated Inflow Production Ration (IPR curve), skin thickness, well performance plots, and the like. Analysis and reporting from use of application B might typically include representation of a calculated production profile, forecast, events detected (such as sand or water breakthrough), and the like. Operational scenarios resulting from such analysis might include adjusting choke settings, initiating well workovers or similar activities. Various other commercial applications may be similarly used in such workflows, which are well known in the art. The participants, system and applications described and illustrated in reference FIG. 3A and FIG. 3B may also be applied to the same workflow components illustrated in FIGS. 4A, 4B, 5A, 5B and 6.

Exemplary workflows utilizing the system architecture, according to the method illustrated in FIG. 2B are illustrated in FIGS. 4-7. Each figure either represents a routine workflow or one that is periodically performed. Changes to these workflows are denoted by shading the changed step(s). These workflows may be described as:

1) Automated workflows, whereby the traditional workflow is automated to remove significant demands on the participants in order to operate the workflow;
2) Adaptive workflows, whereby the traditional workflow is significantly changed by means of introduction of additional steps or functionality that effect additional transformation within the workflow; and
3) Synergistic workflows, whereby multiple traditional workflows are integrated to create a 'super' workflow that spans and orchestrates the multiple workflows to effect novel transformations that would not normally be otherwise achieved by the individual traditional workflows.

Figure 4A:
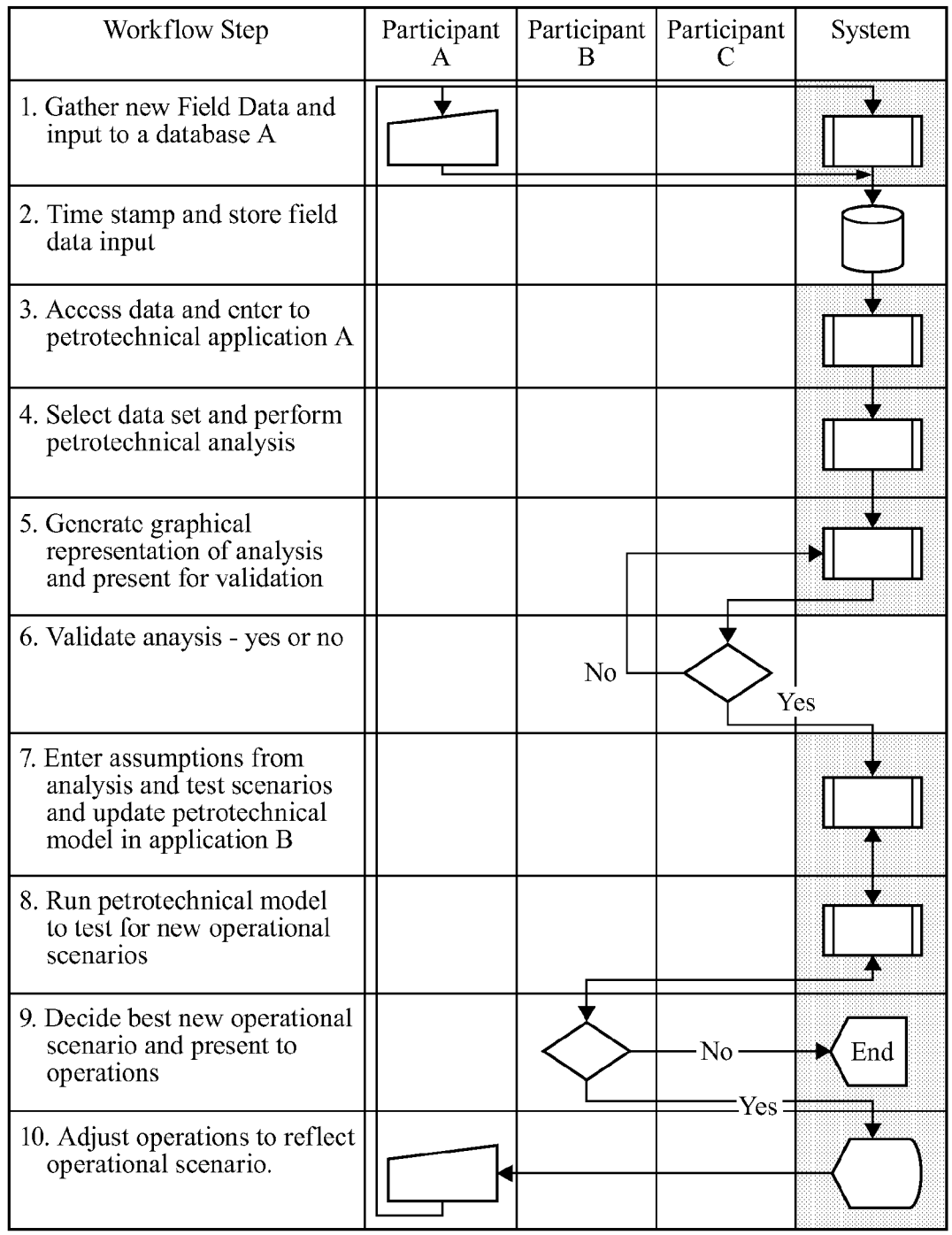
FIG. 4A illustrates an automated routine workflow.
Figure 4B:
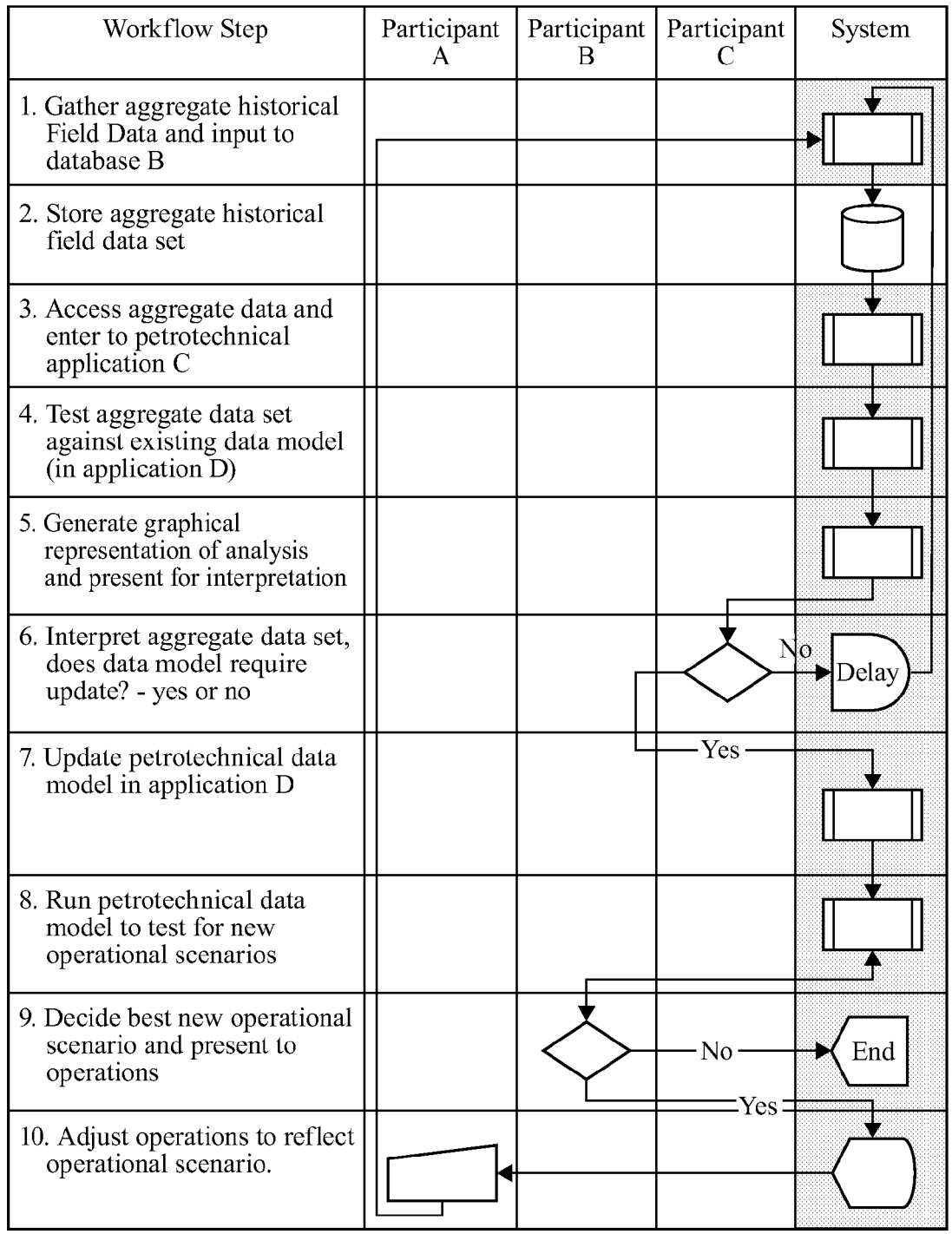
FIG. 4B illustrates an automated periodic workflow.

Referring now to FIG. 4A and FIG. 4B, an automated routine workflow (4A) and an automated periodic workflow (4B) are illustrated for production management and reservoir management, respectively. These workflows represent a typical (or actual) asset. Such automated workflows are characterized by the system performing many routine tasks previously performed by the participants, engaging the participants only when they are required, for example, to validate and outcome or to make or authorize a decision outcome. As illustrated by the comparison of FIG. 3A to FIG. 4A and FIG. 3B to FIG. 4B, the shaded steps in the System column of FIG. 4A and FIG. 4B represent traditional workflow steps that are now automated within the system. The benefits are primarily in time saving and consistency, there is no significant change to the transformations effected by the steps of the workflows. The workflow logic is not substantially changed and core steps remain largely as normally executed; that is, no additional transformation occurs as a result of the automated workflow except that the participants experience is changed by means of automation. This could be as simple as automation of operation of a single application considered a workflow or, alternatively, could involve multiple applications and steps considered to be a workflow.

Figure 5A:
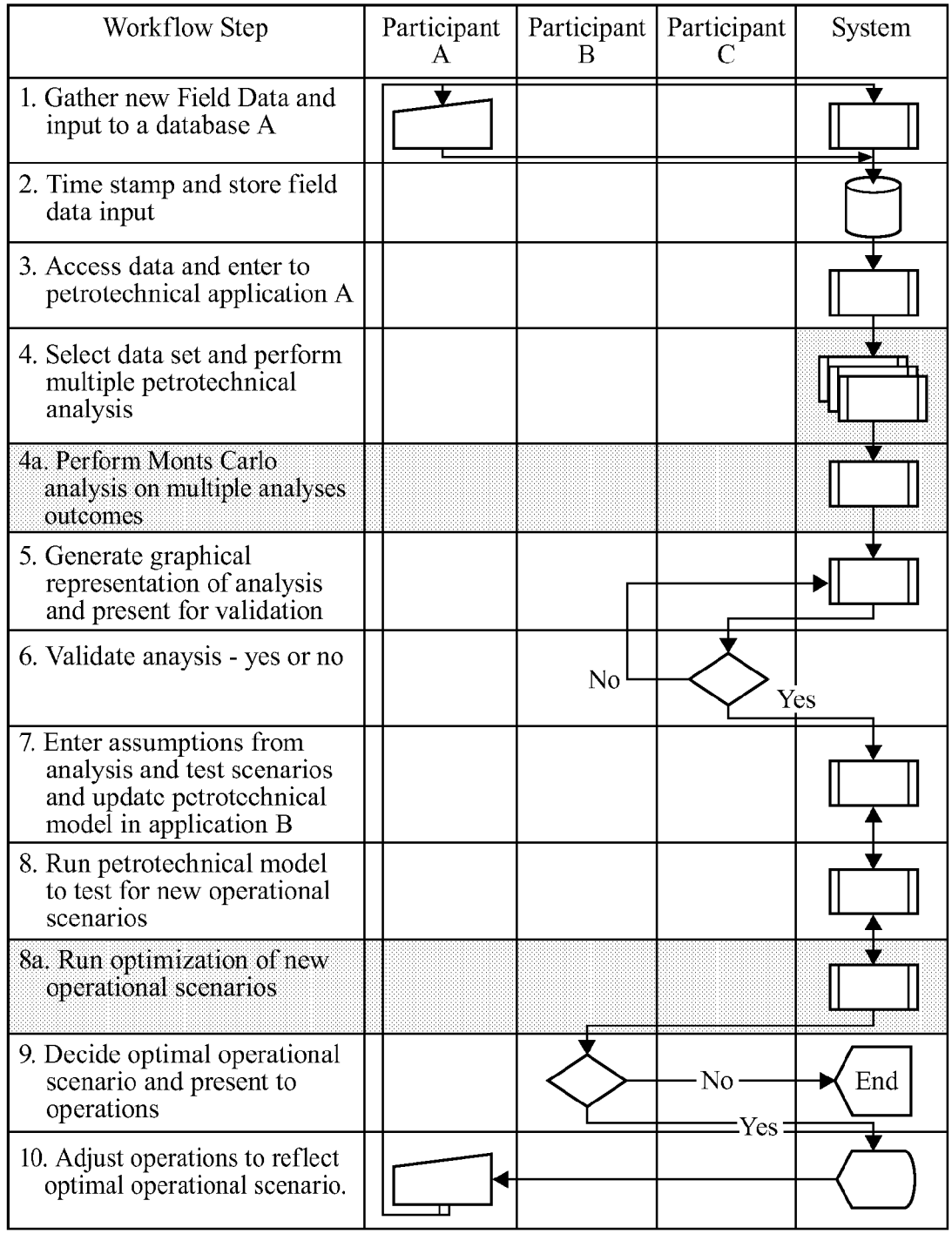
FIG. 5A illustrates an adaptive routine workflow.
Figure 5B:
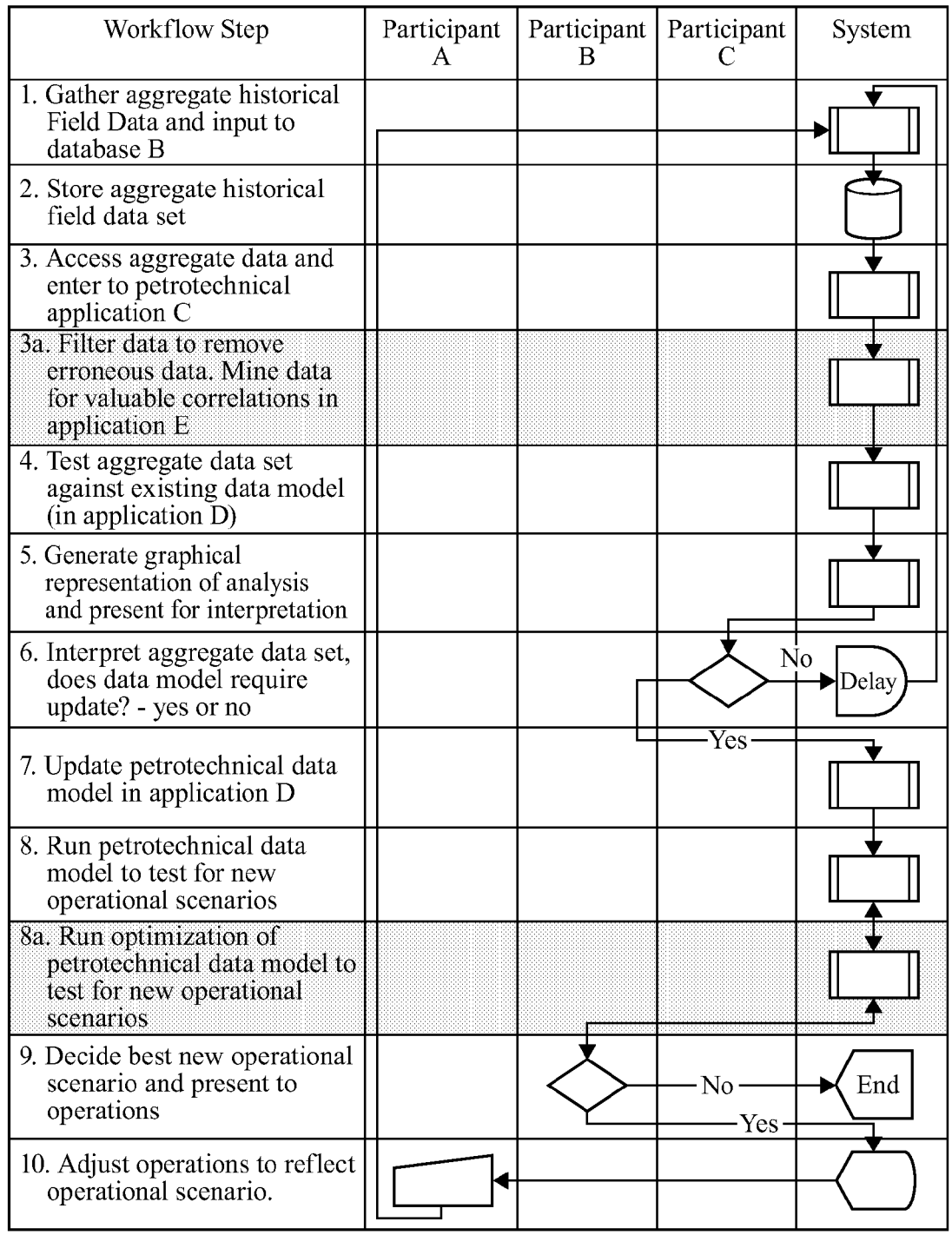
FIG. 5B illustrates an adaptive periodic workflow.

Referring now to FIG. 5A and FIG. 5B, an adaptive routine workflow (5A) and an adaptive periodic workflow (5B) are illustrated for production management and reservoir management, respectively. Adaptive workflows are characterized by the system enabling additional tasks previously not performed by the participants, primarily due to time and technology constraints. The ability to both incorporate additional applications, functionality and computing resources readily, as well being able to automate time consuming tasks within the workflow allow for the workflows to make better use of all available resources. As illustrated by the shaded steps in FIG. 5A (steps 4a and 8a) and FIG. 5B (steps 3a and 8a), additional steps are enabled that were not previously performed by the participants or the system in the traditional workflows (FIG. 3A and FIG. 3B) and the automated workflows (FIG. 4A and FIG. 4B). The shaded step in the System column of FIG. 5A (step 4) represents a change from the corresponding step in FIG. 4A (step 4). The benefits are in the value added by additional steps introduced to the workflow. There are significant changes to the transformations effected by the additional steps of the workflows, which include novel changes to the workflow logic (e.g. from a linear workflow to a non-linear flow or the introduction of additional iterations that add value), and novel additional activities introduced to the workflow (such as novel analysis and changed use of i) traditional data, ii) novel data derived from novel activities or iii) aggregate data sets) not normally undertaken by the traditional workflow.

Figure 6:
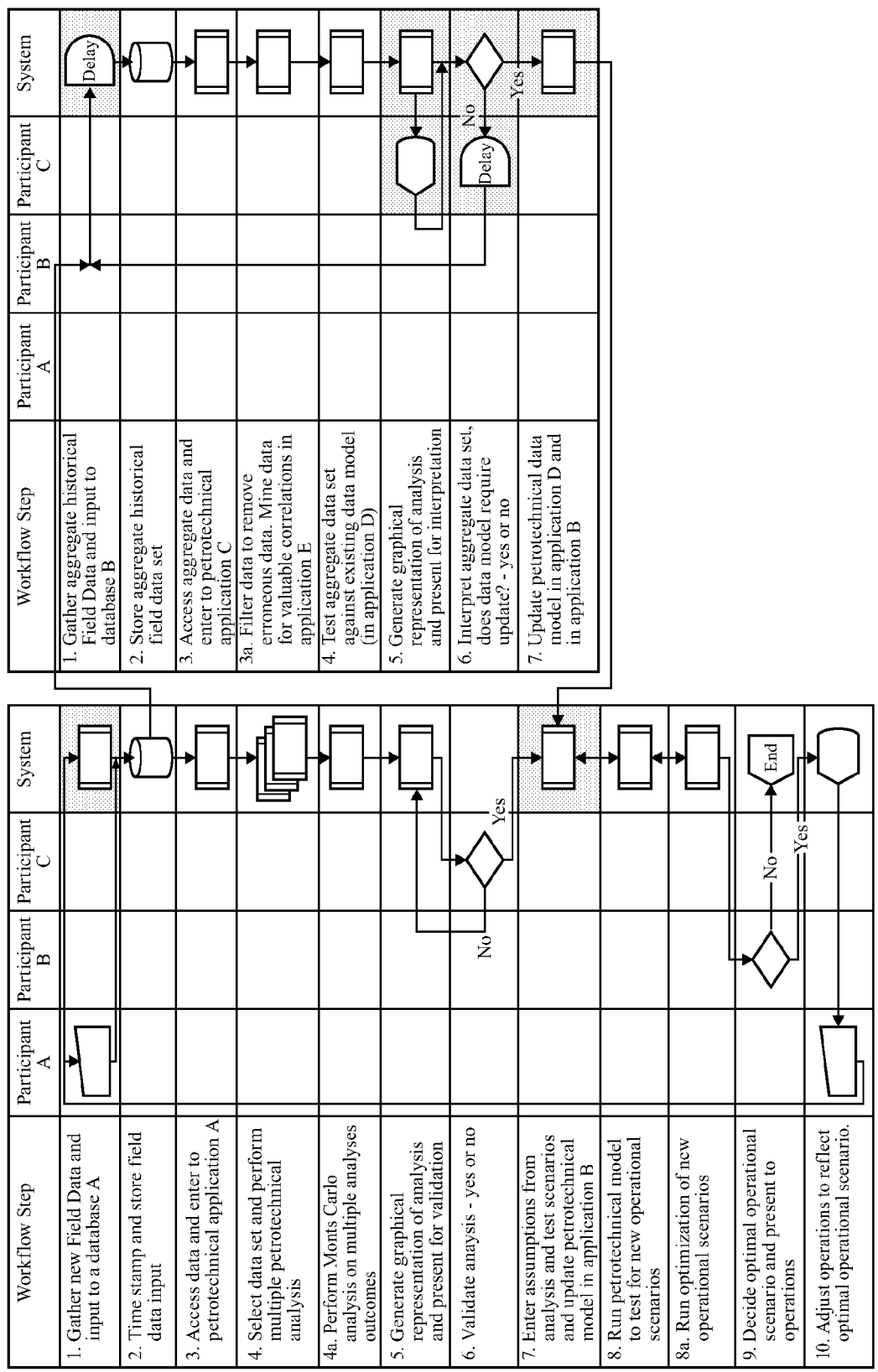
FIG. 6 illustrates a simultaneous or concurrent synergistic workflow.

Referring now to FIG. 6, a simultaneous or concurrent synergistic workflow is illustrated. The super workflows created by integrating multiple traditional workflows may encompass the key facets of either automated and/or adaptive workflows, and may introduce further novel transformative steps as illustrated by the shading of various steps.

Figure 7:
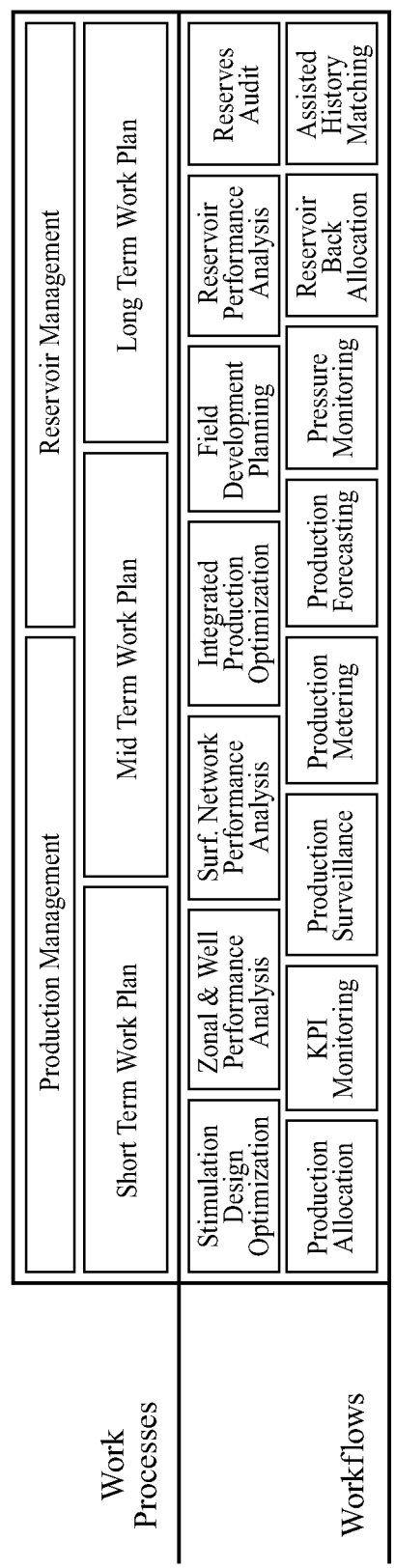
FIG. 7 is a block diagram illustrating various workflows that may be performed within the framework of the present invention.

Referring now to FIG. 7, a block diagram illustrates various workflows traditionally associated with both reservoir and production management activities that may be performed within the framework of the present invention in either automated, adaptive or synergistic workflows.

Figure 8:
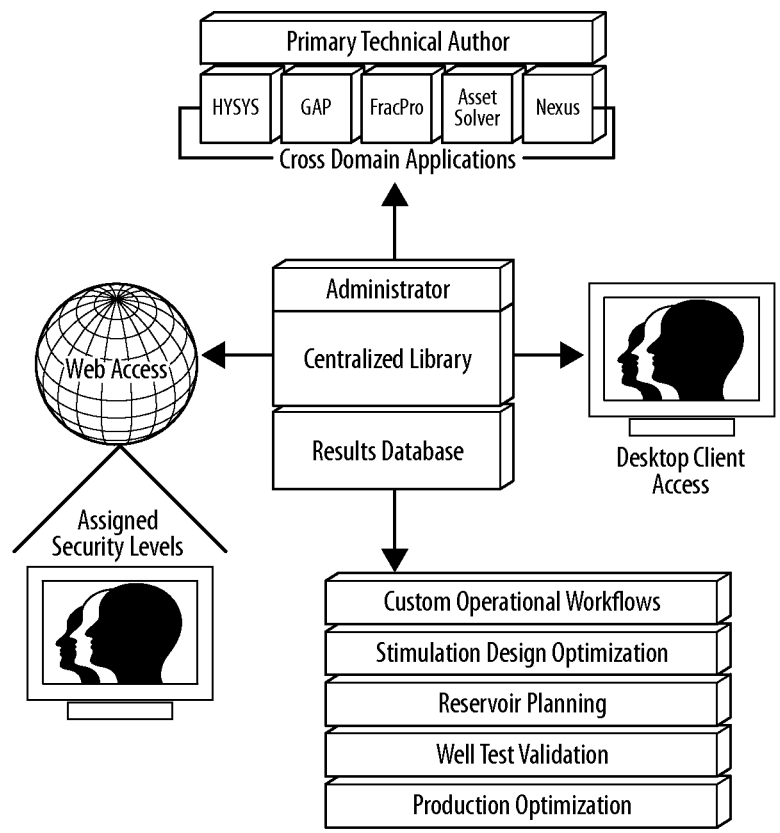
FIG. 8 illustrates an exemplary deployment of the present invention.
Figure 8:
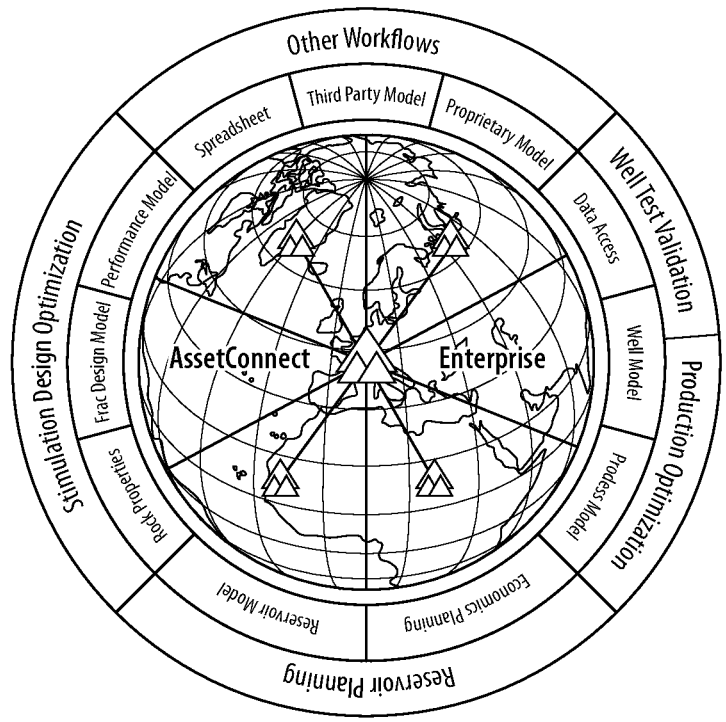

Referring now to FIG. 8, an exemplary deployment of the present invention is illustrated. Considerations for deployment of such automated or transformed workflows must include access for a wider audience of users beyond the technical workflow author. A typical user of an automated workflow may not be intimately familiar with the individual applications or models, which make up the workflow. A central library of workflows may be maintained and distributed to expert and non-expert users through either a desktop client or a web-based interface where users can both initiate workflows and view progress and results. The centralized library is a secure computing environment where individual workflows and their associated applications and models can be maintained and versioned accordingly to maintain their integrity.

Several embodiments of the workflows illustrated in FIG. 7 are addressed in reference to FIGS. 9-12 and may be performed within the workflow framework of an automated adaptive and/or synergistic workflow according to FIGS. 4-6.

Workflow 1

Production Management and Optimization

Figure 9:
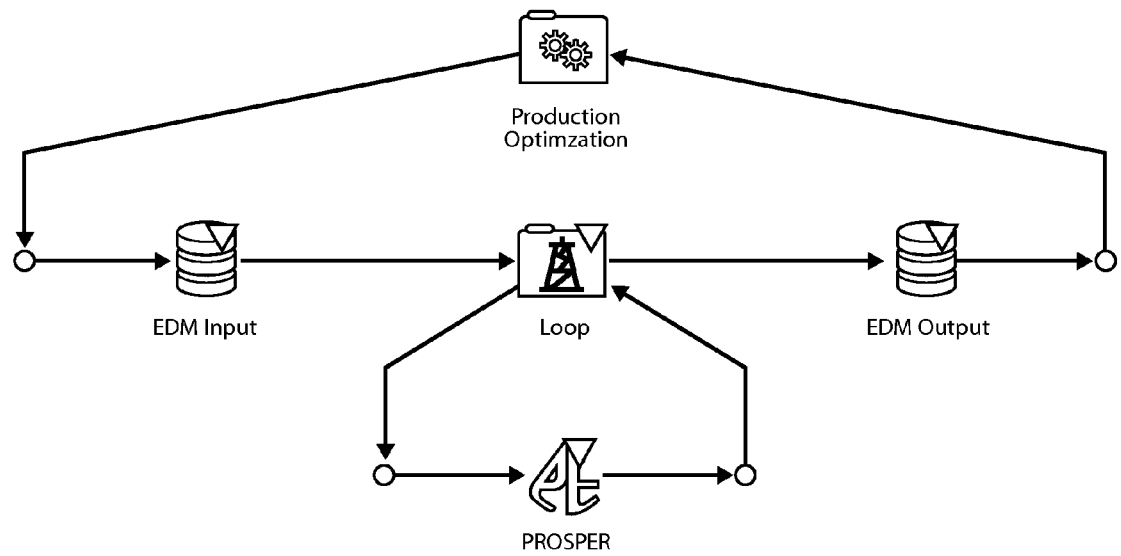
FIG. 9 illustrates one embodiment of a production management and optimization workflow according to the present invention.

Production engineers are increasingly asked to optimize the performance of larger and more complex assets. Their well counts are getting higher and the amount of data they need to analyze is ever expanding. By automating the well performance data acquisition and analysis, the production engineer can better manage his field by exception and focus his attention on the areas with the most potential value. FIG. 9 illustrates such a workflow.

In this workflow, field measured well head pressures and flows are regularly collected by the assets production database (e.g. EDM™). EDM™ is a commercial database application marketed by Landmark Graphics Corporation. On daily intervals, the automated workflow framework collects well pressures and current reservoir pressure(s) from the production database(s). The automated workflow uses a rigorous well model (e.g. Prosper™) to estimate the theoretical flow of each well. Prosper™ is a commercial software application marketed by Petroleum Experts. This theoretical rate is stored in the production database and can then be visualized against the measured flow on a regular basis. Wells which deviate significantly from its theoretical performance can be flagged to the production engineer for immediate attention.

Workflow 2

Frac Stimulation Design Optimization

Figure 10:
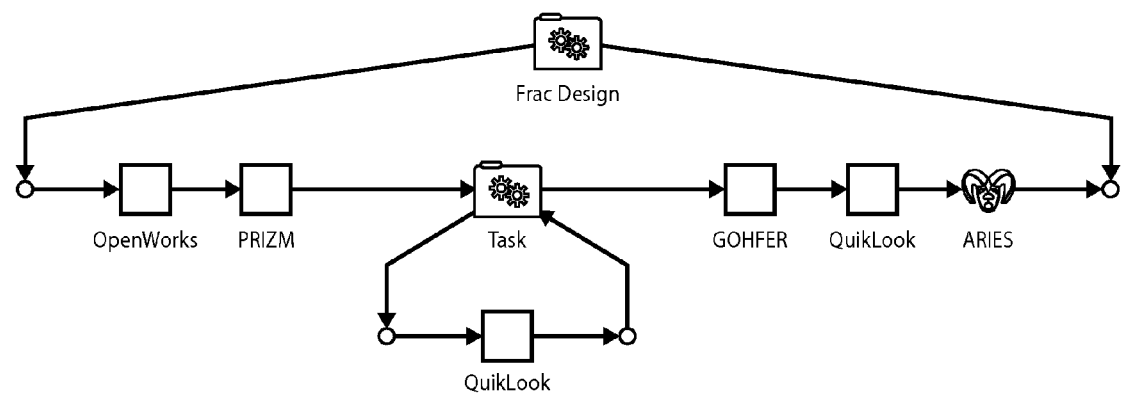
FIG. 10 illustrates one embodiment of a fracture stimulation design optimization workflow according to the present invention.

Billions of dollars are spent annually on fracture stimulation operations. It is critical that these expensive operations be done right and on-time. Accurate and optimal designs are key to ensuring a successful fracture operation. However, a successful design includes several technical components such as rock mechanics and properties, fluid properties and scheduling, frac conditions and placement, and economic conditions. Software applications exist for all of these to help engineers. One example of how these applications may be integrated in a workflow is illustrated in FIG. 10.

In a preferred embodiment, the invention may be applied to a fracture design workflow. Fracturing is a technique applied to petroleum wells to establish or improve the flow of petroleum into a well completion for an extended period of time. The fracture treatment has a limited lifespan and is not inexpensive, Applying a fracture treatment to a well may well cost between Two Hundred Fifty Thousand Dollars ($250,000.00) and Five Hundred Thousand Dollars ($500,000.00), if not more, per treatment. The expected life of a treatment is between two and five years. As can be appreciated, the effectiveness of a fracture is dependent upon the characteristics of the reservoir rock and the design of the fracture. Often there is considerable uncertainty of the reservoir rock characteristics. In some cases, the uncertainty of reservoir rock may be mitigated by the fracture design. Thus the fracture design workflow has two basic functions: fracture design evaluation and fracture design optimization.

In a preferred embodiment, fracture design evaluation (FDE) is accomplished by three applications. The first application permits a user to review a well log record and to make an evaluation of the reservoir characteristics for the section or sections of the wellbore to be fractured. The results of this evaluation is shared with the second and third applications. This first application may be performed using Prizm™, which is a commercial software application marketed by Landmark Graphics Corporation, although other applications are available with similar capabilities. The second application permits a user to adjust the fracture design parameters and to estimate the expected fracture dimensions, namely fracture half length, fracture height, and fracture width. This second application may be performed using FracPro®, which is a commercial software application marketed by Pinnacle Technologies, although other applications are available with similar capabilities. Finally, a third application is used which uses the reservoir characteristics and fracture dimensions for a specific treatment design to make an estimate of the resultant well completion cumulative production over the expected life of the fracture treatment. This third application may be performed in an established tool known as Predict K™, which is a commercial software application marketed by Core Lab, although other applications are available with similar capabilities. After the workflow is developed using these three applications, the scope of the workflow may be widened to use other applications in a similar manner.

Fracture design optimization may use the basic FDE process to evaluate a set of fracture designs to determine which design gives the best cumulative production. Further, each design in the set may be evaluated over a range of reservoir uncertainty so that the fracture designs may also be optimized with regard to reservoir uncertainty.

Workflow 3

Digital Completion Optimization System

Figure 11:
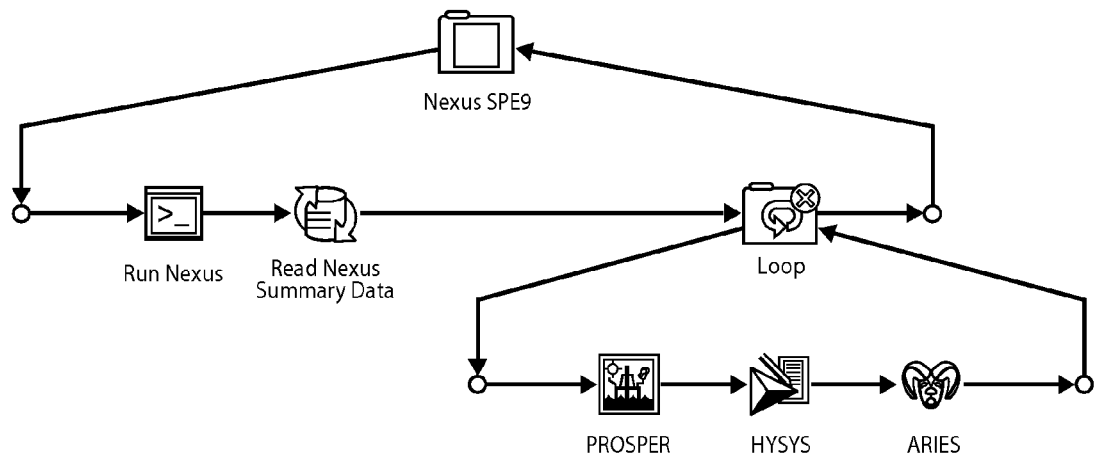
FIG. 11 illustrates one embodiment of a production forecasting and planning workflow according to the present invention.

This workflow automates all aspects of the design execute evaluate and learn (DEEL) loop for well stimulation and completion activities for a tight gas field. In order to maximize production and minimize completion costs many different disciplines and activities are needed; geology, geophysics, stimulation, and production people have to work collaboratively. It is common that each of these disciplines work singularly and serially passing work product between one another. Furthermore the teams cannot effectively review past results and easily incorporate any lessons. The digital completion optimization system creates a common platform for all activities. The design workflow incorporates well log analysis from a program such as Prizm® with geology stress analysis and production prediction (e.g. SWIFT®, which is a commercial software application marketed by Halliburton Energy Services Inc.) and a fracture design program (e.g. Stimplan™, which is a commercial software application marketed by NSI Technologies). The design workflow is explained in detail in the Frac Stimulation Design Optimization above. The execution workflow monitors the fracture job and automatically history matches the fracture design and well production predictions. The evaluate loop utilizes artificial intelligence algorithms such as neural networks and support vectors to mine the data generated from all of the design and execution workflows on all jobs from multiple databases. The analysis from the data mining workflow is used in an optimization system to update design parameters used in the design and execute workflows. FIG. 11 illustrates an exemplary embodiment of this workflow.

Workflow 4

Gas Lift Allocation and Optimization

Figure 12:
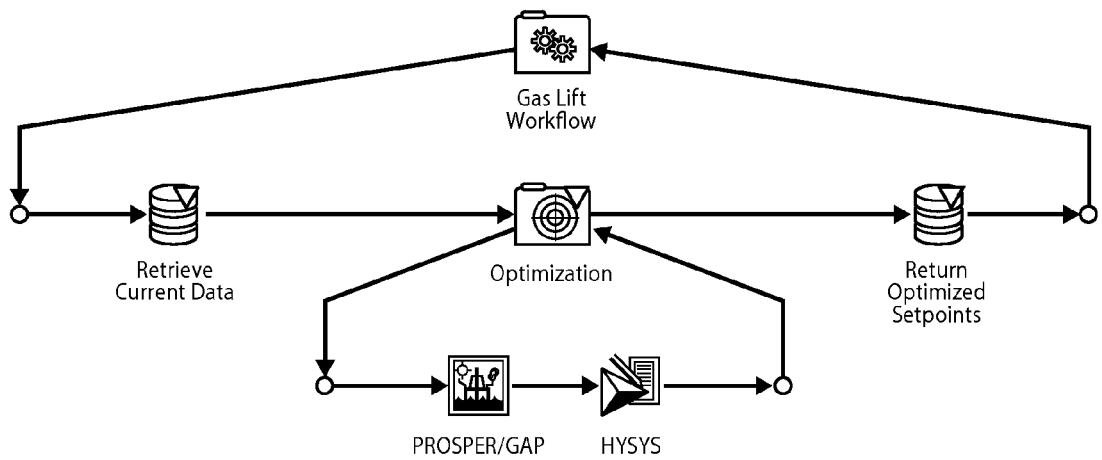
FIG. 12 illustrates one embodiment of a gas lift allocation and optimization workflow according to the present invention.

Gas lift is a popular method for enhancing production in heavier oil wells. However, increasingly the performance constraints of the downstream facilities are limiting the total amount of gas lift available. Making the right decisions on how much gas lift to send to which well is a complex process involving well performance models, flowline hydraulics and facility process performance. An example of a gas lift allocation and optimization workflow is illustrated in FIG. 12.

In this workflow, individual well gas lift injection rates must be optimized based on overall production benefits and the availability of lift gas. On a regular basis, perhaps nightly, production data is captured and used as input for well, gathering network and facility models. Individual well gas lift rates can then be allocated across all the wells and optimized for maximum oil production while maintaining any applicable surface constraints.

This invention therefore, provides a flexible framework within which multiple and disparate workflows may be performed as an automated, adaptive or synergistic workflow using a common platform and domain. Each type of workflow adds value across a diverse range of workflows. Thus, lost time spent finding the data and operating the technical applications that underpin core workflows, which has been cited by some operators as consuming up to 75% engineering time, is reduced. The present invention therefore, enables:
1. Collaborative orchestration of diverse technical oriented workflows common to upstream oil and gas production within a common computing environment;
2. Automation of multi-step workflows involving the use of diverse technical applications;
3. Transformation of automated workflows through the introduction of novel, value-added steps, not normally practical within the upstream oil and gas operations environment;
4. Interchangeability of specific technical applications within common workflows in order to accommodate a diversity of preferred applications experienced in the upstream oil and gas production community;
5. Wide enterprise access to the automated and transformed workflows through a centrally managed "library" and desktop or web based GUI; and
6. Integrity of the workflow by centrally managing the versioning of individual workflows and their constituent application components.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method of performing an adaptive routine workflow, which comprises:
    selecting an oilfield data set stored in a petrotechnical application;
    performing an analysis of the oilfield data set using the petrotechnical application to determine multiple analysis outcomes, which comprise a skin thickness and a well performance plot;
    performing a Monte-Carlo analysis on each of the multiple analysis outcomes;
    validating at least one of the multiple analysis outcomes;
    determining a new operational scenario using an updated petrotechnical model and one of the validated multiple analysis outcomes;
    optimizing the new operational scenario using a computer processor and at least one of a calculated production profile, a forecast and events detected; and
    adjusting oilfield operations based on the optimized new operational scenario by adjusting a choke and initiating a well workover.

2. The method of claim 1, wherein the adaptive routine workflow is a non-linear workflow.

3. A non-transitory program carrier device tangibly carrying computer-executable instructions for performing an adaptive routine workflow, the instructions being executable to implement:
    selecting an oilfield data set stored in a petrotechnical application;
    performing an analysis of the oilfield data set using the petrotechnical application to determine multiple analysis outcomes, which comprise a skin thickness and a well performance plot;
    performing a Monte-Carlo analysis on each of the multiple analysis outcomes;
    validating at least one of the multiple analysis outcomes;
    determining a new operational scenario using an updated petrotechnical model and one of the validated multiple analysis outcomes;
    optimizing the new operational scenario and at least one of a calculated production profile, a forecast and events detected; and
    adjusting oilfield operations based on the optimized new operational scenario by adjusting a choke and initiating a well workover.

4. The program carrier device of claim 3, wherein the adaptive routine workflow is a non-linear workflow.

5. A method for performing an adaptive periodic workflow, which comprises:
    selecting an oilfield data set stored in a petrotechnical application;
    removing erroneous data from the oilfield data set;
    determining a correlation between data remaining in the oilfield data set and data in another petrotechnical application;
    updating a petrotechnical data model based on an interpretation of the oilfield data set and the correlation;
    determining a new operational scenario using the updated petrotechnical data model;
    optimizing the new operational scenario using a computer processor and at least one of a calculated production profile, a forecast and events detected; and
    adjusting oilfield operations based on the optimized new operational scenario by adjusting a choke and initiating a well workover.

6. The method of claim 5, wherein the updated petrotechnical data model is optimized to determine the new operational scenario.

7. A non-transitory program carrier device tangibly carrying computer-executable instructions for performing an adaptive periodic workflow, the instructions being executable to implement:
    selecting an oilfield data set stored in a petrotechnical application;
    removing erroneous data from the oilfield data set;
    determining a correlation between data remaining in the oilfield data set and data in another petrotechnical application;
    updating a petrotechnical data model based on an interpretation of the oilfield data set and the correlation;
    determining a new operational scenario using the updated petrotechnical data model;
    optimizing the new operational scenario and at least one of a calculated production profile, a forecast and events detected; and adjusting oilfield operations based on the optimized new operational scenario by adjusting a choke and initiating a well workover.

8. The program carrier device of claim 7, wherein the updated petrotechnical data model is optimized to determine the new operational scenario.

9. A method for performing a synergistic workflow, which comprises:
   selecting an oilfield data set stored in a petrotechnical application;
   selecting another oilfield data set stored in another petrotechnical application;
   performing an analysis of the another data set using the another application to determine multiple analysis outcomes, which comprise a skin thickness and a well performance plot;
   performing a Monte-Carlo analysis on each of the multiple analysis outcomes;
   validating at least one of the multiple analysis outcomes;
   updating a petrotechnical data model based on an interpretation of the oilfield data set;
   determining a new operational scenario using the updated petrotechnical data model and one of the validated multiple analysis outcomes;
   optimizing the new operational scenario using a computer processor and at least one of a calculated production profile, a forecast and events detected; and
   adjusting oilfield operations based on the optimized new operational scenario by adjusting a choke and initialing a well workover.

10. The method of claim 9, wherein the synergistic workflow is simultaneous or concurrent.

11. The method of claim 9. wherein the synergistic workflow is non-linear.

12. A non-transitory program carrier device tangibly carrying computer-executable instructions for performing a synergistic workflow, the instructions being executable to implement:
   selecting an oilfield data set stored in a petrotechnical application;
   selecting another oilfield data set stored in another petrotechnical application;
   performing an analysis of the another oilfield data set using the another petrotechnical application to determine multiple analysis outcomes, which comprise a skin thickness and a well performance plot;
   performing a Monte-Carlo analysis on each of the multiple analysis outcomes;
   validating at least one of the multiple analysis outcomes;
   updating a petrotechnical data model based on an interpretation of the oilfield data set;
   determining a new operational scenario using the updated petrotechnical data model and one of the validated multiple analysis outcomes;
   optimizing the new operational scenario and at least one of a calculated production profile, a forecast and events detected; and
   adjusting oilfield operations based on the optimized new operational scenario by adjusting a choke and initiating a well workover.

13. The program carrier device of claim 12, wherein the synergistic workflow is simultaneous or concurrent.

14. The program carrier device of claim 12. wherein the synergistic workflow is non-linear.

* * * * *